United States Patent [19]

Nakaya et al.

[11] 4,065,276
[45] Dec. 27, 1977

[54] AIR-CLEANER

[75] Inventors: Akira Nakaya; Haruyoshi Maruyama, Akashi, both of Japan

[73] Assignee: Akashi Factory, Kawasaki Heavy Industries, Ltd., Akashi, Japan

[21] Appl. No.: 672,715

[22] Filed: Apr. 1, 1976

[30] Foreign Application Priority Data

Apr. 14, 1975 Japan .................................. 50-51074

[51] Int. Cl.² .............................................. B01D 25/04
[52] U.S. Cl. ........................................ 55/276; 55/492; 55/499; 55/504; 55/521; 55/DIG. 21; 55/DIG. 28; 181/229
[58] Field of Search ........ 55/276, DIG. 21, DIG. 28, 55/503, 504, 499, 521, 492; 181/33 K, 35 A, 36 C, 50, 53, 55, 68, 69

[56] References Cited

U.S. PATENT DOCUMENTS

| 1,717,369 | 6/1929 | Clements | 55/DIG. 28 X |
|---|---|---|---|
| 1,994,006 | 3/1935 | Rensink | 55/276 |
| 2,064,207 | 12/1936 | Jacobs | 55/276 |
| 2,067,160 | 1/1937 | Rensink | 55/276 X |
| 2,322,110 | 6/1943 | Bock | 55/521 X |
| 2,701,024 | 2/1955 | Thomas | 55/DIG. 28 X |
| 2,788,086 | 4/1957 | Sebok | 55/276 |
| 2,865,467 | 12/1958 | McMichael | 181/35 A |
| 2,905,268 | 9/1959 | McMichael | 55/276 |
| 2,954,091 | 9/1960 | McMichael | 55/276 X |
| 3,772,857 | 11/1973 | Jackson et al. | 55/503 X |

FOREIGN PATENT DOCUMENTS

| 2,142,008 | 2/1973 | Germany | 181/35 A |

Primary Examiner—Bernard Nozick
Assistant Examiner—Kathleen J. Prunner
Attorney, Agent, or Firm—Wenderoth, Lind & Ponack

[57] ABSTRACT

This invention relates to improvements in an air-cleaner for internal combustion engines, more particularly, to an improved air-cleaner having such sound-silencing construction that an air-cleaner element is removably fixed in a vibration-isolating cover which is provided in the housing of the air-cleaner.

1 Claim, 2 Drawing Figures

AIR-CLEANER

BACKGROUND AND SUMMARY OF THE INVENTION

This invention relates to improvements in an air-cleaner, more particularly, to an improved air-cleaner having sound-silencing construction for internal combustion engines.

Conventionally, the housing of the air-cleaner for internal combustion engines is box-shaped and is made of thin steel sheet or synthetic resin sheet in order to make it lighter in weight and also to improve production efficiency. Therefore, the housing of air-cleaner itself is easy to resonate with the pulsation developed by inspiratory pressure of the internal combustion engine. This results in causing more noises.

The present invention has for an object to eliminate the above-mentioned defect of the conventional air-cleaner and is intended for providing the air-cleaner of such double construction that an air-cleaner element is removably fixed in a vibration-isolating cover which is provided in the housing of the air-cleaner.

BRIEF DESCRIPTION OF THE DRAWING

The nature and advantages of the present invention will be understood more clearly from the following description made with reference to the accompanying drawings, in which.

DETAILED DESCRIPTION OF THE INVENTION

Figure 1:
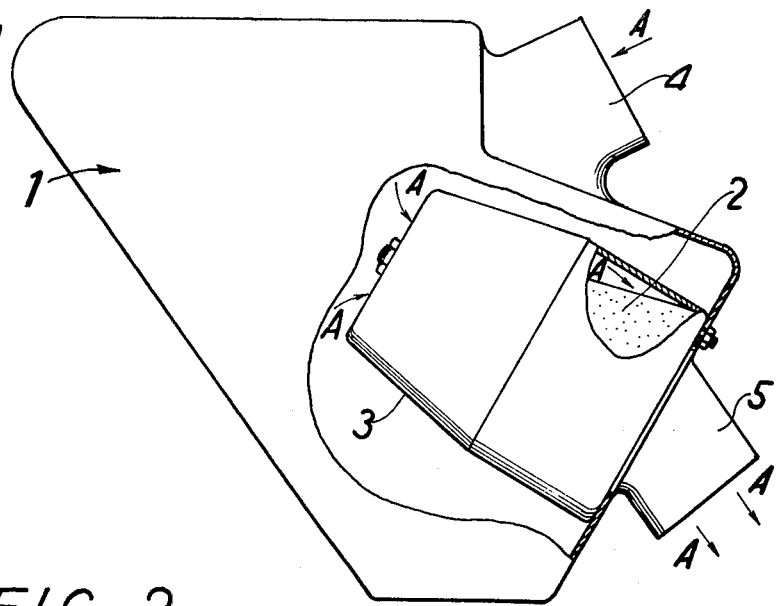
FIG. 1 is a front view of the internal construction of the air-cleaner according to the present invention, partly broken away.

In FIG. 1, numerals 1, 2 and 3 denote an air-cleaner housing, an air-cleaner element and a vibration-isolating cover respectively. The air-cleaner housing 1 is provided with an inlet 4. The air taken in through the inlet 4 is led as shown by arrows A in FIG. 1, is filtered by the air-cleaner element 2 and is further led into a carburetor (not shown in the drawings) through an outlet 5.

Figure 2:
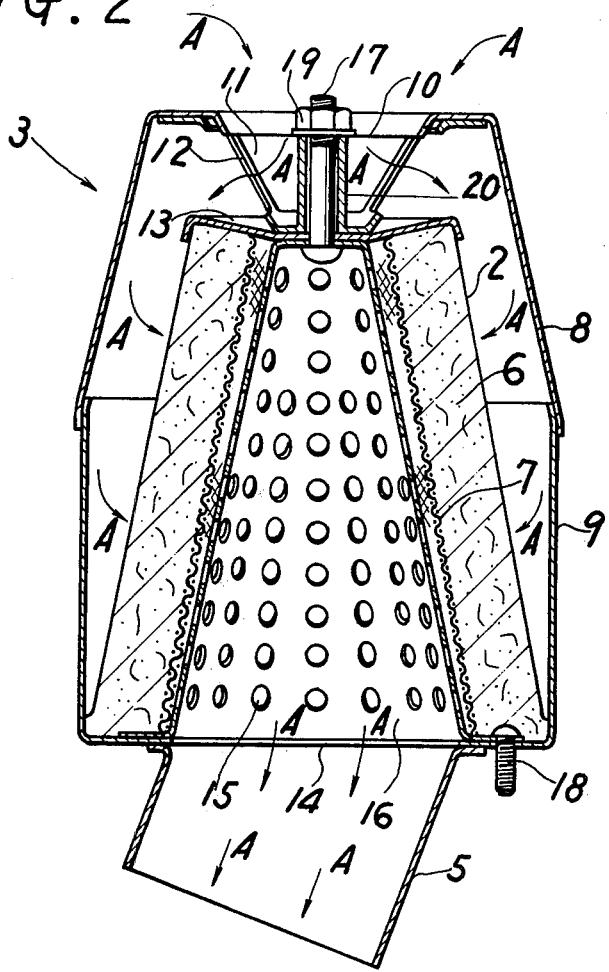
FIG. 2 is a longitudinal section, at the center, of a vibration-isolating cover in which an air-cleaner element is accommodated.

As to the construction of the afore-mentioned air-cleaner element 2 and vibration-isolating cover 3, as shown in FIG. 2, the cleaner element 2 is conically and hollow in shape and comprises a filter 6, such as felt, and an air-permeable liner 7, such as wire cloth, supporting the filter 6. The vibration-isolating cover 3 consists of an upper truncated portion 8 and a lower cylindrical portion 9. The upper portion 8 is open at its bottom side and has at its upper side an air inflow opening 10, at the inner surface of which an inverted, truncated connecting spider 12 is provided which has ventilating windows 11 therethrough and a hollow guide post 20 extending upwardly through the conical portion thereof. Connected to the lower end of the connecting spider 12 and surrounding the guide post 20 is a dish-shaped support plate 13. The lower portion 9 is open at its upper side and has at its base an air outflow opening 14. Fixed to the outer circumference of the air outflow opening 14 is the bottom of a truncated support 16 provided with many ventilating holes 15. A binding bolt 17, which is to pass through guide post 20, is fixed to the top end of the support 16. Fixed to the opening 14 of the lower portion 9 is the outlet 5. At the outer circumference of the opening 14 is fixed a guide bolt 18.

The afore-mentioned element 2 is placed in such a fashion that it covers the support 16 of the lower portion 9. The upper portion 8 engages with the lower portion 9, whereby the upper end of the element 2 makes direct contact with the support plate 13 and both are fixed together by fastening the binding bolt 17 with a nut 19. Thus, the vibration-isolating cover 3 as a whole is fixed to the air-cleaner housing 1 by means of the guide bolt 18.

As mentioned above, in the air-cleaner according to the present invention, the element is accommodated in the double construction comprising the housing and the vibration-isolating cover. Under this arrangement, the inspiratory pressure is kept from acting directly on the wall surface of the air-cleaner housing, with the result that noises usually caused by resonation with pulsation of the inspiratory pressure are reduced to a great extent.

Besides, according to the present invention the vibration-isolating cover is integral with the air-cleaner housing and such integral construction has large effect of silencing the pulsating inspiratory sound, which, coupled with vibration-isolating effect of the aforementioned air-cleaner housing, can silence noises to a large extent.

What is claimed is:

1. An air cleaner which isolates the pulsation of inspiratory pressure from an internal combustion engine, said air cleaner comprising:
   a hollow air cleaner housing having an inlet opening thereinto and an outlet opening therefrom, said outlet opening being connected to the induction system of said internal combustion engine;
   a vibration-isolating cover removeably positioned within said air cleaner housing, said cover comprised of:
      a cylindrical lower portion completely open at the top thereof and having an outlet opening in the bottom thereof fitted over said outlet opening of said air cleaner housing, and
      a truncated, conical upper portion completely open at the bottom thereof and removeably fitted over said open top of said lower portion, the narrower upper portion thereof having an inlet opening through the top surface thereof aligned with said outlet opening through said lower portion;
   a truncated conical support being narrower at the top than at the bottom, said conical support further having perforated sidewalls and being positioned within said lower portion at the bottom thereof over said outlet opening ;
   a bolt fixed to the top of said conical support and extending upwardly therefrom and a nut being threaded to the top projecting end of said bolt;
   an inverted, truncated conical connecting spider fixed to and projecting downward toward said conical support from the underside of said truncated upper portion of said vibration-isolating cover around said inlet opening therein, said spider being open at the portion thereof adjacent said inlet opening, said spider further having a hollow guide post through the conical portion thereof surrounding said upwardly projecting bolt;
   a support plate connected to the bottom end of said spider and surrounding said bolt and extending radially beyond the top of said conical support;
   a hollow, conical and truncated air cleaner element postioned between said support plate and the bottom of said cylindrical lower portion of said vibration-isolating cover, surrounding said conical support and spaced substantially along the entire length thereof from the sidewalls of said vibration-isolation cover.

* * * * *

UNITED STATES PATENT AND TRADEMARK OFFICE
CERTIFICATE OF CORRECTION

PATENT NO. : 4,065,276
DATED : December 27, 1977
INVENTOR(S) : Akira Nakaya and Haruyoshi Maruyama It is certified that error appears in the above-identified patent and that said Letters Patent are hereby corrected as shown below:

In the heading [73] change "Akashi Factory, Kawasaki Heavy Industries, Ltd., Akashi, Japan" to --Kawasaki Heavy Industries, Ltd., Kobe, Japan--

Signed and Sealed this

Fifth Day of September 1978

[SEAL]

Attest:

RUTH C. MASON
Attesting Officer

DONALD W. BANNER
Commissioner of Patents and Trademarks